(No Model.)
H. M. ANDERSON.
WEIGHT HOLDER.
No. 533,027.  Patented Jan. 22, 1895.
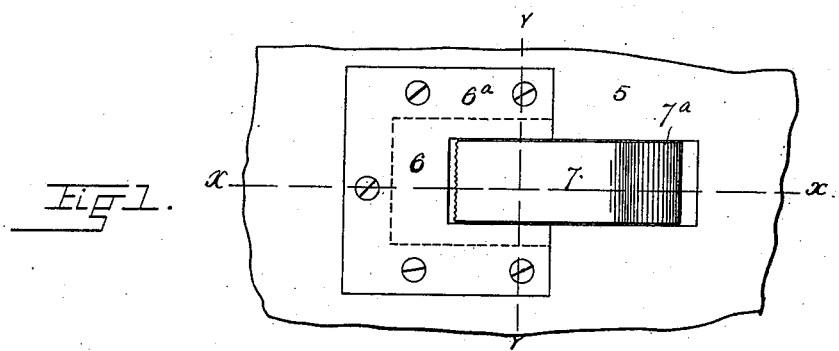
Fig. 1.
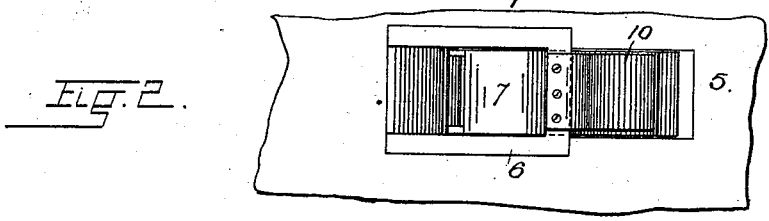
Fig. 2.
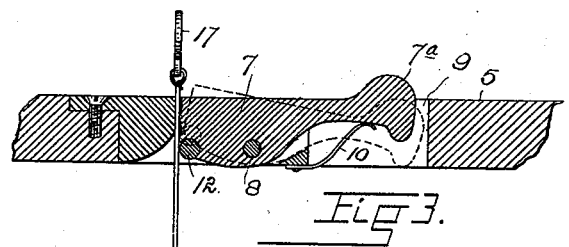
Fig. 3.
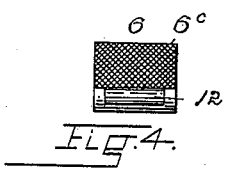
Fig. 4.
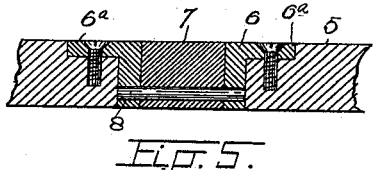
Fig. 5.
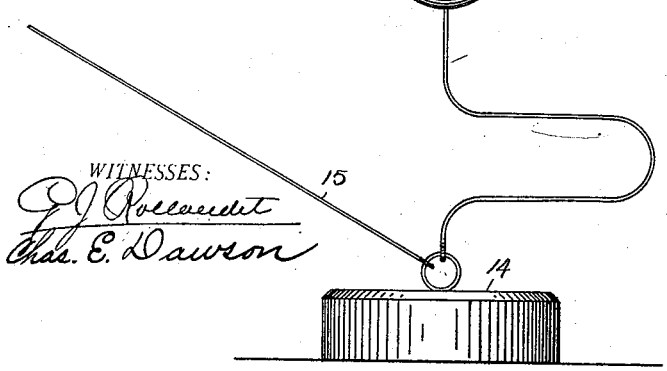
WITNESSES:
INVENTOR
H. M. Anderson
BY
ATTORNEY

UNITED STATES PATENT OFFICE.

HARRY M. ANDERSON, OF DENVER, COLORADO, ASSIGNOR OF TWO-THIRDS TO EPHRIAM A. HILLMAN AND ELMER G. HILLMAN, OF SAME PLACE.

WEIGHT-HOLDER.

SPECIFICATION forming part of Letters Patent No. 533,027, dated January 22, 1895.

Application filed August 3, 1894. Serial No. 519,326. (No model.)

*To all whom it may concern:*

Be it known that I, HARRY M. ANDERSON, a citizen of the United States of America, residing at Denver, in the county of Arapahoe and State of Colorado, have invented certain new and useful Improvements in Automatic Weight-Holders; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in automatic weight holders, and the object of the invention is to facilitate the manipulation of hitching weights used in connection with vehicles.

To this end, the invention consists of the features hereinafter described and claimed, all of which will be fully understood by reference to the accompanying drawings in which is illustrated an embodiment thereof.

In the drawings, Figure 1 is a top or plan view of the device in position for use. Fig. 2 is an underneath view of the same. Fig. 3 is a vertical longitudinal section taken on the line *x—x*, Fig. 1. The weight, the supporting strap and the hitching strap are shown in this view. Fig. 4 is a front view of the device in detail. Fig. 5 is a vertical cross-section taken on the line *y—y*, Fig. 1.

Similar reference characters indicating corresponding parts or elements in these views, let the numeral 5 designate the bottom of the wagon body apertured to receive the device, which is fastened thereto in any suitable manner.

The device consists of a block 6 and a dog 7 pivoted in this block. These parts are preferably composed of metal. The block 6 is provided with a flange 6ª apertured to receive fastening devices, as screws.

The bottom of the wagon body is cut out on the margin of the aperture to receive the flange, whose upper surface should be in the same plane with the upper surface of the vehicle-bottom. The block 6 is recessed to receive the dog which is maintained in operative relation with the block by means of a pivot pin 8 which passes through an aperture in the dog and co-inciding apertures in the block, formed on either side of the recess. The tail 7ª of the dog projects into an opening 9 in the bottom 5, this opening being a continuation of that in which the block is inserted. This tail piece normally, or when in the locked position, projects slightly above the bottom of the vehicle, as indicated by full lines in Fig. 3. It is engaged underneath by a spring 10 whose opposite extremity is attached to the block 6 on the under side. When the tail piece is depressed, this spring has a tendency to return the dog to the locked or normal position. The extremity of the dog opposite the tail piece is located in suitable proximity to the wall of the block located at the end of the recess which receives the dog, whereby the dog is adapted to grasp the weight strap 13 which is run through between the wall of the block and the locking face of the dog, which is preferably roughened on the engaging face as shown at 6ᶜ. (See Fig. 4.) As shown in the drawings, the dog is provided with an anti-frictional roller 12 pivoted in the dog just below the face 6ᶜ. The function of this roller is to make easier, the raising of the weight by reducing the friction between the strap and the engaging face of the dog.

This device is specially designed for use on delivery wagons used in business requiring many and frequent stops, as milk wagons.

The device is attached to the bottom of the wagon, and the tail of the dog is located within easy reach of the driver's foot. The strap 13 to which the weight 14 is attached, is passed up through the bottom of the wagon between the face 6ᶜ of the locking dog, and the adjacent wall of the dog-holding block. Another strap 15 is connected at one extremity with the weight, and with the bits of the horses at the opposite extremity.

An auxiliary weight 16 is employed, whose function is to slacken the strap just above the main weight when dropped. If the horses start, the entire gravity of the weight is exerted in pulling upon their bits. Were it not for this slackened condition of the strap, the power of the weight-pull on the bits might be reduced to some extent by the tendency of the wagon to drag the weight.

From the foregoing description, the operation of the device will be readily understood. The upper extremity of the strap 13 is provided with a ring or other suitable hand-piece 17 which is located above the upper surface of the vehicle-bottom, and within easy reach of the driver when it is desired to raise the weight.

Referring specially to Fig. 3, I will assume that the weight has been dropped to rest upon the ground by pressing upon the tail piece of the dog and forcing the latter to the dotted line position, whereby the face 6ᶜ of the dog is disengaged from the strap. After the weight 14 has reached the ground, the auxiliary weight will draw the strap down far enough to slacken the strap sufficiently above the main weight. The team is now hitched. When the driver is ready to go ahead, he grasps the ring 17 and raises the weight 14. The upward pull on the strap throws the dog to the dotted line position, which it readily assumes, there being very little resistance. The roller 12 engages the strap as the latter is drawn up and reduces the friction between the strap and the engaging parts. The strap is drawn up far enough to raise the weight 14 sufficiently from the ground to clear all obstructions. As soon as the upward pull on the strap ceases, the face 6ᶜ of the dog grasps the strap automatically and supports the weight in the raised position.

Having thus described my invention, what I claim is—

1. The combination with the strap or other suitable instrumentality passed through the bottom of the vehicle body, of the main weight attached to the strap, the auxiliary weight attached to the strap between the main weight and the vehicle body, and suitable means attached to the vehicle body for automatically grasping the weight-supporting strap, substantially as described.

2. The combination with the supporting strap or other suitable instrumentality passed through the bottom of the vehicle body, of the main weight attached to said strap, the auxiliary weight attached to the strap between the vehicle and the main weight, and means attached to the vehicle for grasping the strap and holding the weights, said means consisting of a block and a dog pivoted in the block, substantially as described.

3. A weight holder comprising a recessed block, a dog pivoted in the block and having a roughened locking face located in suitable proximity to the wall of the recess, a spring supporting the tail piece of the dog, and a roller pivoted in the locking extremity of the dog below the roughened face, substantially as described.

In testimony whereof I affix my signature in the presence of two witnesses.

HARRY M. ANDERSON.

Witnesses:
G. J. ROLLANDET,
CHAS. E. DAWSON.